(12) United States Patent
Basson et al.

(10) Patent No.: US 12,375,285 B2
(45) Date of Patent: Jul. 29, 2025

(54) ENHANCED CRYPTOGRAPHIC HASH DIGESTS USING QUANTUM COMPUTING

(71) Applicant: Accenture Global Solutions Limited, Dublin (IE)

(72) Inventors: Johannes Jacobus Louw Basson, Arlington, VA (US); Benjamin Glen McCarty, Washington, DC (US)

(73) Assignee: Accenture Global Solutions Limited, Dublin (IE)

( * ) Notice: Subject to any disclaimer, the term of this patent is extended or adjusted under 35 U.S.C. 154(b) by 222 days.

(21) Appl. No.: 18/229,930

(22) Filed: Aug. 3, 2023

(65) Prior Publication Data
US 2025/0047493 A1    Feb. 6, 2025

(51) Int. Cl.
*H04L 9/32*    (2006.01)
*H04L 9/08*    (2006.01)

(52) U.S. Cl.
CPC .......... *H04L 9/3236* (2013.01); *H04L 9/0852* (2013.01); *H04L 9/0869* (2013.01)

(58) Field of Classification Search
CPC .... H04L 9/0852; H04L 9/0869; H04L 9/3236
See application file for complete search history.

(56) References Cited

U.S. PATENT DOCUMENTS

| | | | |
|---|---|---|---|
| 8,533,848 B2* | 9/2013 | Jin | G06F 21/10 380/204 |
| 9,514,415 B2* | 12/2016 | Bocharov | G06N 10/60 |
| 11,681,774 B1* | 6/2023 | Wang | G06N 10/60 708/553 |
| 2010/0212015 A1* | 8/2010 | Jin | H04L 9/3236 707/E17.014 |
| 2014/0280427 A1* | 9/2014 | Bocharov | B82Y 10/00 708/200 |
| 2023/0376577 A1* | 11/2023 | Flöther | G06F 21/16 |
| 2025/0005419 A1* | 1/2025 | Hong | G06N 10/60 |

OTHER PUBLICATIONS

Li et al., "Discrete-time interacting quantum walks and quantum Hash schemes," Quantum Information Processing, May 24, 2012, 12:1501-1513.

* cited by examiner

*Primary Examiner* — Sharon S Lynch
(74) *Attorney, Agent, or Firm* — POLSINELLI PC

(57) ABSTRACT

Methods, systems, and apparatus for enhancing cryptographic hash digests. In one aspect, a method includes obtaining a hash digest that represents a data input. Symbols in the hash digest are divided into a number of groups of equal size. Each group is mapped to a respective point on a Bloch sphere. A quantum system comprising multiple qubits is initialized by initializing each qubit of the multiple qubits in a quantum state specified by a respective point on the Bloch sphere. An expectation value of the initialized quantum system is computed to obtain a quantum fingerprint for the data input.

20 Claims, 8 Drawing Sheets

ENHANCED CRYPTOGRAPHIC HASH DIGESTS USING QUANTUM COMPUTING

TECHNICAL FIELD

This specification relates to the fields of cryptography, computer security, and quantum computing.

BACKGROUND

A hash function is a function that can be used to map data of arbitrary size and type to fixed-length strings of characters. The values returned by a hash function are called hash digests, hash values, hash codes, or hashes. Hash functions are used in several forms of digital communication and have various use cases including password storage, digital signatures, file management, and authentication.

Hash functions can act as one-way functions—they are easy and fast to compute forward, but hard to reverse back (e.g., generally requiring significant number of computing resources). A wide range of hash functions exist, however many can be unsecure (e.g., reversible without significant consumption of computing resources).

SUMMARY

This specification describes systems, methods, devices, and other techniques for enhancing cryptographic hash digests using quantum computing.

In general, one innovative aspect of the subject matter described in this specification can be implemented in a method that includes obtaining a hash digest that represents a data input; dividing symbols in the hash digest into a number of groups of equal size; mapping each group to a respective point on a Bloch sphere; initializing a quantum system comprising multiple qubits, comprising initializing each qubit of the multiple qubits in a quantum state specified by a respective point on the Bloch sphere; and computing an expectation value of the initialized quantum system to obtain a quantum fingerprint for the data input.

Other implementations of this aspect include corresponding computer systems, apparatus, and computer programs recorded on one or more computer storage devices, each configured to perform the actions of the methods. A system of one or more classical computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations mapping each group to a respective point on a Bloch sphere comprises: determining, based on the number of groups, a magnitude of rotation around the Bloch sphere per increment of symbols in the hash digest; dividing symbols in each group into a first subgroup of symbols and a second subgroup of symbols; generating, using the magnitude of rotation, a mapping between candidate subgroups in a set of candidate subgroups and respective degrees of rotation around the Bloch sphere, wherein the first subgroup and second subgroup are elements of the set of candidate subgroups; and using the mapping to map, for each group, the first subgroup of symbols and right subgroup of symbols to respective rotations around the Bloch sphere.

In some implementations mapping the first subgroup of symbols and right subgroup of symbols to respective rotations around the Bloch sphere comprises mapping the first subgroup to a colatitude angle for a rotation around the Bloch sphere and mapping the right subgroup to a longitude angle for the rotation around the Bloch sphere.

In some implementations the method further comprises converting the colatitude angle and the longitude angle from degrees to radians.

In some implementations determining the magnitude of rotation around the Bloch sphere per increment of symbols in the hash digest comprises computing $360/(h^{q/2}-1)$, where h represents a maximum number of different symbols in the hash digest, and g represents the number of groups.

In some implementations mapping each first subgroup of symbols and a right subgroup of symbols to respective rotations around the Bloch sphere using the magnitude of rotation per increment, comprising: mapping a first candidate subgroup to a zero rotation around the Bloch sphere, and iteratively incrementing the zero rotation around the Bloch sphere by the magnitude of rotation, wherein at each iteration a subsequent candidate subgroup is mapped to the incremented rotation around the Bloch sphere, to obtain a mapping of all candidate subgroups to respective rotations around the Bloch sphere.

In some implementations initializing the quantum system and computing the expectation value of the initialized quantum system comprises classically simulating initialization of the quantum system and computation of the expectation value.

In some implementations initializing the quantum system and computing the expectation value of the initialized quantum system comprises: transmitting a request to a quantum computer to perform quantum computations to initialize the quantum system and compute the expectation value; and receiving a computed expectation value from the quantum computer.

In some implementations mapping each group to a respective point on a Bloch sphere comprises for each group, determining a colatitude angle and a longitude angle that specifies the respective point of the Bloch sphere.

In some implementations initializing a qubit of the multiple qubits in a quantum state specified by a respective point on the Bloch sphere comprises applying a parameterized single qubit rotation gate to the qubit, wherein parameters of the single qubit rotation gate comprise the colatitude angle and the longitude angle that specifies the point of the Bloch sphere.

In some implementations computing the expectation value of the initialized quantum system comprises: computing a statevector of the initialized quantum system; and converting the statevector into an array of continuous values, wherein entries in the array comprises probability amplitudes that corresponds to respective symbols of a hashing algorithm used to generate the hash digest.

In some implementations the number of groups comprises a pre-determined number of groups specified by a user, wherein the number of groups corresponds to a number of qubits in the multiple qubits.

In some implementations the hash digest comprises an even number of symbols.

In some implementations the method further comprises receiving the data input and data identifying a user-specified hashing algorithm; and applying the hashing algorithm to the data input to generate the hash digest.

In some implementations the quantum fingerprint comprises an array of continuous values, and wherein the method further comprises applying a hashing algorithm to the quantum fingerprint to obtain an enhanced hash digest for the data input.

In some implementations the method further comprises receiving a predetermined sampling strategy selected by a user; sampling values of the quantum fingerprint according to the predetermined sampling strategy; and providing the sampled values of the quantum fingerprint as output or applying a hashing algorithm to the sampled values of the quantum fingerprint to obtain an enhanced hash digest for the data input.

In some implementations the method is performed by a first party; the data input comprises data shared with a second party; and the method further comprises: receiving, from the second party, a first array of values sampled from a quantum fingerprint generated by the second party and a first random number; sampling a second array of values from the quantum fingerprint generated by the first party using a sampling strategy seeded by the first random number; and validating the first array of values by comparing the second array of values to the first array of values.

In some implementations the method further comprises generating a second random number from an interval that ranges from zero to two to the power of the number of groups; sampling a third array of values from the quantum fingerprint generated by the first party using the sampling strategy seeded by the second random number; and providing, to the second party, the third array of values and the second random number, wherein the second party uses the second random number to validate the third array of values.

The subject matter described in this specification can be implemented in particular ways so as to realize one or more of the following advantages.

Many hash digests are not safe from hash algorithm attacks and adversaries performing such attacks are sometimes able to recover original information from hash digests. For example, in brute force attacks, an adversary generates a large amount of the data that is being hashed and sends the data through the corresponding hash function to see if it produces a same hash digest. If an identical hash digest is found on some randomly generated data, then the adversary has successfully recovered the original data. Other example attacks include partial collision attacks, birthday attacks, and cryptanalysis attacks.

A system implementing the presently described techniques enhances hash digests generated from classical or quantum data, e.g., improves the security of hash digests and their robustness against adversarial attacks (relative to conventional hashing techniques). A given hash digest is processed using configurable parameters and quantum computing operations to generate a quantum fingerprint. Because the quantum fingerprint is generated using quantum computing operations (either directly using a quantum computer or indirectly using a classical simulator), the quantum fingerprint is more complex (e.g., has a larger search space for a brute force attack and has an improved avalanche effect) and therefore better protected from adversarial attacks. In addition, the quantum fingerprint can be further processed, e.g., hashed or sampled, to increase its complexity.

In addition, the presently described techniques for enhancing hash digests can be used to enhance any hashed information, e.g., hash digests generated from classical or quantum data. In addition, the configurability of parameters in the presently described techniques allows users to validate shared secrets with each other over untrusted channels for cryptography purposes as well as adding additional complexity and/or entropy.

Further, whilst the presently described techniques are motivated by quantum computing and can be implemented using classical and quantum computation, the techniques do not require a quantum computer and can also be implemented using classical computations only. Special purpose hardware, e.g., fault tolerant quantum computers, are not required.

Further, the presently described techniques are widely applicable to various areas of technology. In particular, since the presently described techniques enhance a given hash digest (whether the hash digest is known to be weak or not), the techniques can be used in any application where hash digests are currently used, e.g., password or user information storage, to verify document integrity, to establish identity, to spot malicious or otherwise altered code, in blockchain and cryptocurrency applications, cookies or session ID's, digital signatures, or fast lookups.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods and systems for enhancing cryptographic hash digests using quantum computing. A hash digest is divided into multiple groups of equal size, where the size of each group and total number of groups is dependent on a configurable number of qubits and the hash digest type. Each group is mapped to a respective point on the surface of a Bloch sphere using a mapping that is also dependent on the configurable number of qubits and the hash digest type. A classical or quantum computation is performed to initialize a system of qubits in states that are determined by the Bloch sphere points and compute an expectation value using the initialized qubits. The expectation value is a probability distribution that acts as a quantum fingerprint, which can be output as an enhanced hash digest or further processed, e.g., re-hashed or sampled.

Figure 1:
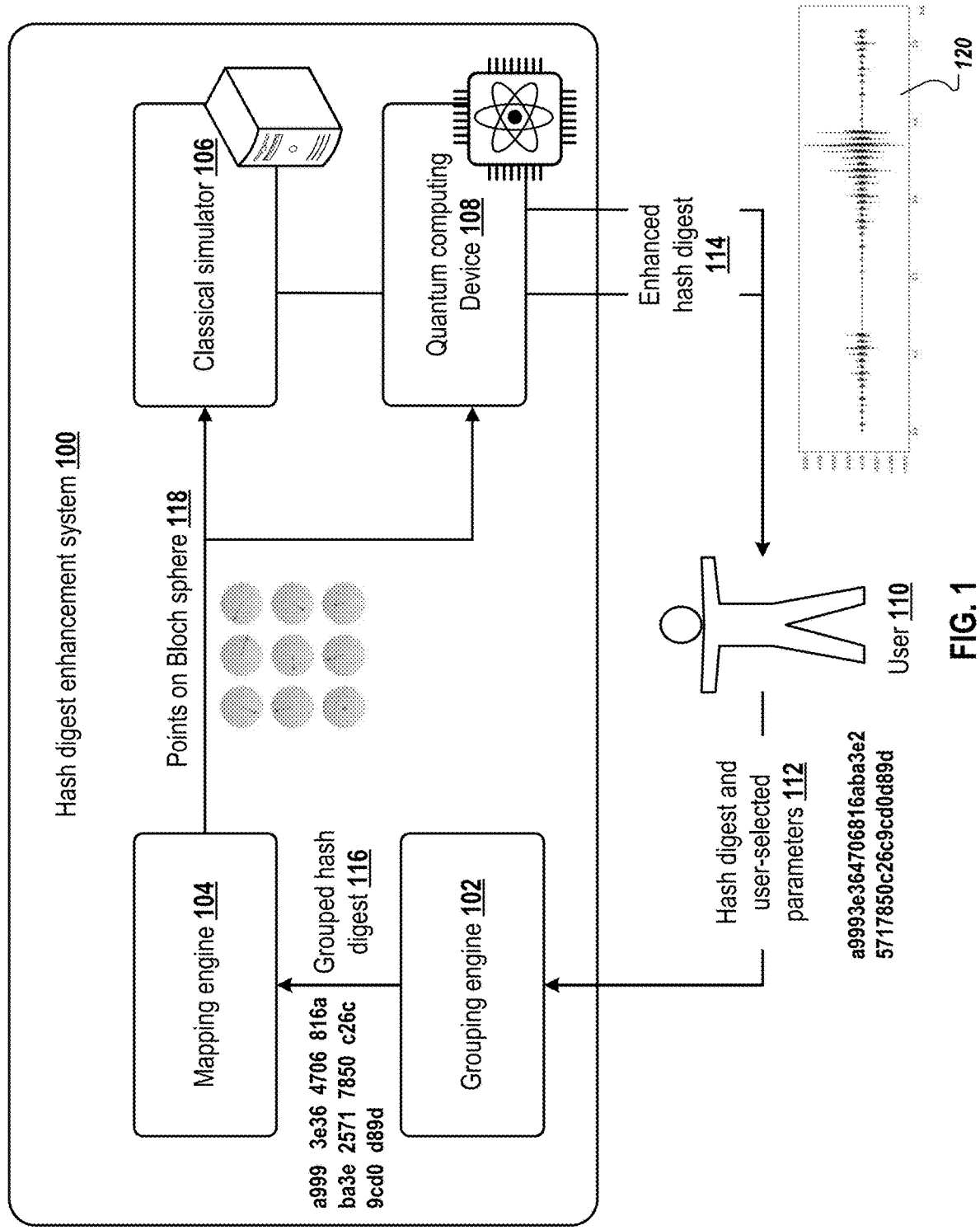
FIG. 1 shows a conceptual block diagram of an example system for enhancing hash digests.

FIG. 1 shows a conceptual block diagram of an example system 100 for enhancing hash digests. The example system 100 includes a grouping engine 102 and a mapping engine 104. In some implementations the example system 100 includes a classical simulator 106. In other implementations the example system 100 includes (or has access to) a quantum computing device 108. In other implementations, as shown in FIG. 1, the example system 100 includes a classical simulator 106 and a quantum computing device 108. Components of the example system 100 can exchange electronic communications over one or more networks, or can exchange communications in another way, such as over one or more wired or wireless connections.

The example system 100 is configured to receive as input, e.g., from a user 110, a hash digest and values of parameters to be used to generate an enhanced version of the hash digest 112. The example system 100 is configured to process the received input 112 using the grouping engine 102, mapping engine 104, and either of the classical simulator 106 or quantum computing device 108 to generate as output an enhanced hash digest 114. In some implementations, the enhanced hash digest 114 can be a quantum fingerprint, e.g., quantum fingerprint 120. In other implementations the enhanced hash digest 114 can be another hash digest, e.g., generated by the example system 100 through application of a hashing algorithm to a quantum fingerprint. In other implementations the enhanced hash digest 114 can be an array of values, e.g., that the example system 100 has sampled from a quantum fingerprint. Example enhanced hash digests that can be output by the example system 100 are described in more detail below with reference to FIGS. 2-4.

The grouping engine 102 is configured to receive the input 112 and use the user-selected parameters to divide the hash digest into a number of groups and generate a grouped hash digest 116. The number of groups corresponds to a number of qubits that will be used by the classical simulator 106 and/or quantum computing device 108 to compute the enhanced hash digest. Example operations performed by the grouping engine 102 are described in more detail below with reference to step 204 of the example process 200 shown in FIG. 2.

The mapping engine 104 is configured to receive the grouped hash digest 116 and map each group to a respective point on a Bloch sphere 118. For example, the mapping engine 104 can use the user-selected parameters to determine, for each group, values of a colatitude angle θ with respect to the z-axis of the Bloch sphere and values of a longitude angle φ with respect to the x-axis of the Bloch sphere. The values of the angles uniquely specify a point on the Bloch sphere, which in turn uniquely specifies the state of a two-level quantum system, e.g., a qubit. Example operations performed by the mapping engine 104 are described in more detail below with reference FIG. 5.

The classical simulator 106 is configured to receive the points on the Bloch sphere 118 and initialize multiple qubits in quantum states specified by the points on the Bloch sphere 118. The classical simulator 106 is further configured to compute an expectation value of the initialized qubits to obtain a quantum fingerprint for the data input. The operations performed by the classical simulator 106 can include classical operations only, e.g., classical simulations of qubit initialization, evolution, and measurements. Example operations performed by the classical simulator 106 are described in more detail below with reference to FIG. 2.

The quantum computing device 108 can also be configured to receive the points on the Bloch sphere 118 and initialize multiple qubits in quantum states specified by the points on the Bloch sphere 118. The quantum computing device 108 can also be configured to compute an expectation value of the initialized qubits to obtain a quantum fingerprint for the data input. The operations performed by the quantum computing device 108 can include quantum operations, e.g., physical qubit initialization, evolution, and measurements, and classical post processing of measurement results to compute the expectation value. Example operations performed by the quantum computing device 108 are described in more detail below with reference to FIG. 2.

Figure 2:
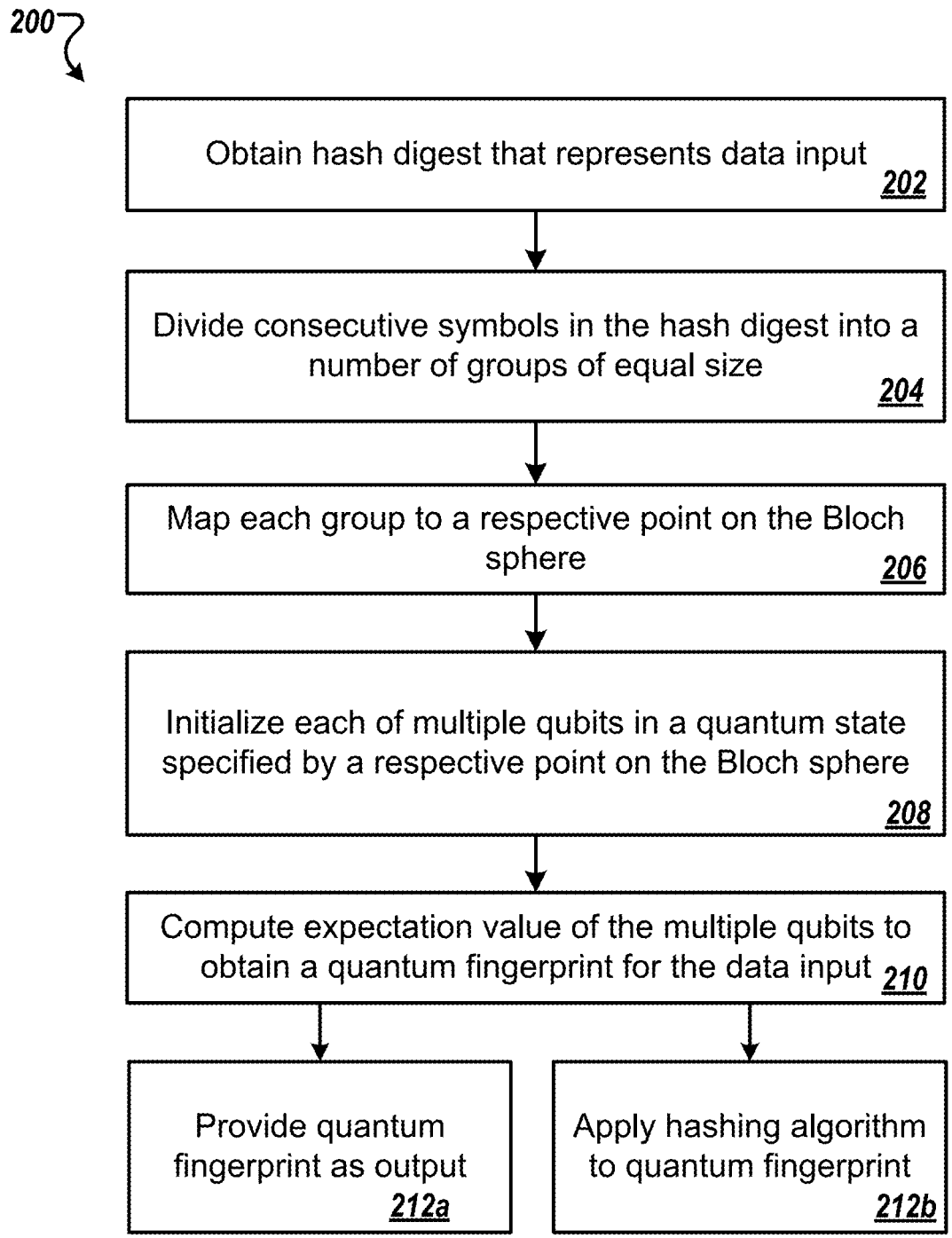
FIG. 2 is a flowchart of an example process for generating a quantum fingerprint from a hash digest.

FIG. 2 is a flowchart of an example process 200 for generating a quantum fingerprint from a hash digest. For convenience, the process 200 will be described as being performed by a system that includes one or more classical computing devices located in one or more locations or one or more hybrid classical-quantum computing devices located in one or more locations. For example, system 100 of FIG. 1, appropriately programmed in accordance with this specification, can perform the process 200.

The system obtains a hash digest (step 202). The hash digest can represent a classical or quantum data input of any size, and can be generated using an arbitrary hashing algorithm, e.g., SHA variants, WHIRLPOOL, or MD variants. The hashing algorithm can be a broken or approved hashing algorithm. In some implementations the system can receive the hash digest directly as input, e.g., together with user-selected values of parameters for generating the quantum fingerprint such as a number of qubits (as described in more detail below with reference to step 204). In other implementations the system can receive the classical or quantum data input and the user-selected parameter values can further include data identifying a hashing algorithm to be used to generate the hash digest. In these implementations, the system can apply the user-selected hashing algorithm to the data input to generate the hash digest.

The system divides consecutive symbols in the hash digest into a number groups of equal size (step 204). The number of groups corresponds to a number of qubits that will be used to compute steps 208 and 210 described below. The number of groups can either be determined by the system, e.g., based on the hashing algorithm used to generate the hash digest and/or based on the system's processing power and capabilities. Alternatively, the number of groups can be a pre-selected by a user and provided as input at step 202. The size of each group depends on the type of hashing algorithm used to generate the hash digest, e.g., the length of the hash digest. Generally, the size g of each group is given by g=l/q, where l represents the length of the hash digest obtained at step 202 and q represents the number of qubits. For example, if the hash digest is generated using a SHA-256 hashing algorithm, the number of groups can be 32, 16, 8, 4, or 2 where the size of each group is 2, 4, 8, 16, or 32, respectively. As another example, if the hash digest is generated using a SHA-1 hashing algorithm, the number of groups can be 20, 10, 5, 4, or 2 where the size of each group is 2, 4, 8, 10, or 20, respectively. As a specific example, the SHA-1 hash digest 78cfa9db542521fd96408f55aa8e793f16ff8905 can be divided into 20 groups as 78, cf, a9, db, 54, 25, 21, fd, 96, 40, 8f, 55, aa, 8e, 79, 3f, 16, ff, 89, and 05 where each group has a size $$g = \frac{40}{20} = 2.$$

The system maps each group to a respective point on a Bloch sphere (step 206). In quantum computing, the Bloch sphere is a geometrical representation of the pure state space of a two-level quantum mechanical system, e.g., a qubit. The Bloch sphere is a unit 2-sphere, with antipodal points corresponding to a pair of mutually orthogonal state vectors. Points on the surface of the sphere correspond to the pure states of the system. Any pure state $|\psi\rangle$ can be represented as $$|\psi\rangle = \cos\frac{\theta}{2}|0\rangle + e^{i\phi}\sin\frac{\theta}{2}|1\rangle$$

where $0 \leq \theta \leq \pi$ and $0 \leq \phi \leq 2\pi$. This representation is always unique because even though the value of $\phi$ is not unique when $|\psi\rangle$ is one of the computational basis states $|0\rangle$ or $|1\rangle$, the point on the Bloch sphere represented by $\theta$ and $\phi$ is unique. The parameters $\theta$ and $\phi$ can be interpreted in spherical coordinates as the colatitude with respect to the z-axis and the longitude with respect to the x-axis, respectively, and uniquely specify a point on the unit sphere in $\mathbb{R}^3$.

To map each group generated at step 204 to a respective point on a Bloch sphere, the system determines a colatitude angle and a longitude angle that specifies the respective point of the Bloch sphere. An example process for mapping groups of hash digest symbols to respective points on the Bloch sphere is described in more detail below with reference to FIG. 5.

The system initializes a quantum system that includes multiple qubits by initializing each qubit of the multiple qubits in a quantum state specified by a respective point on the Bloch sphere (step 208). For example, the system can initialize a qubit of the multiple qubits in a quantum state specified by a respective point on the Bloch sphere by applying a parameterized single qubit rotation gate to the qubit, where parameters of the single qubit rotation gate include a colatitude angle and a longitude angle that specify the point of the Bloch sphere. For example, the single qubit rotation gate can be given by $$U(\theta, \phi, \lambda) = \begin{pmatrix} \cos\theta/2 & -e^{i\lambda}\sin\frac{\theta}{2} \\ e^{i\phi}\sin\frac{\theta}{2} & e^{i(\phi+\lambda)}\cos\theta/2 \end{pmatrix}$$

where $\theta$ and $\phi$ represent the colatitude angle and longitude angle, respectively, and $\lambda$ is an Euler angle which can be set to equal zero.

The system computes an expectation value of the initialized quantum system to obtain a quantum fingerprint for the data input (step 210). For example, the system can perform a computation or apply a function that returns a statevector of the initialized multiple qubits. This statevector can then be converted into an array of continuous values, e.g., an array of $2^{20}$ values in the case that 20 qubits (or 20 groups) are used to perform steps 608 and 610. By construction, each entry in the array is a probability amplitude that corresponds to a respective element of the hash algorithm alphabet. The array therefore specifies a probability distribution. The entries of the array can be taken as is (no absolute values or squares)—which produces negative values as well as positive values. A graphical representation of the probability distribution can be used as the quantum fingerprint.

Figure 3:
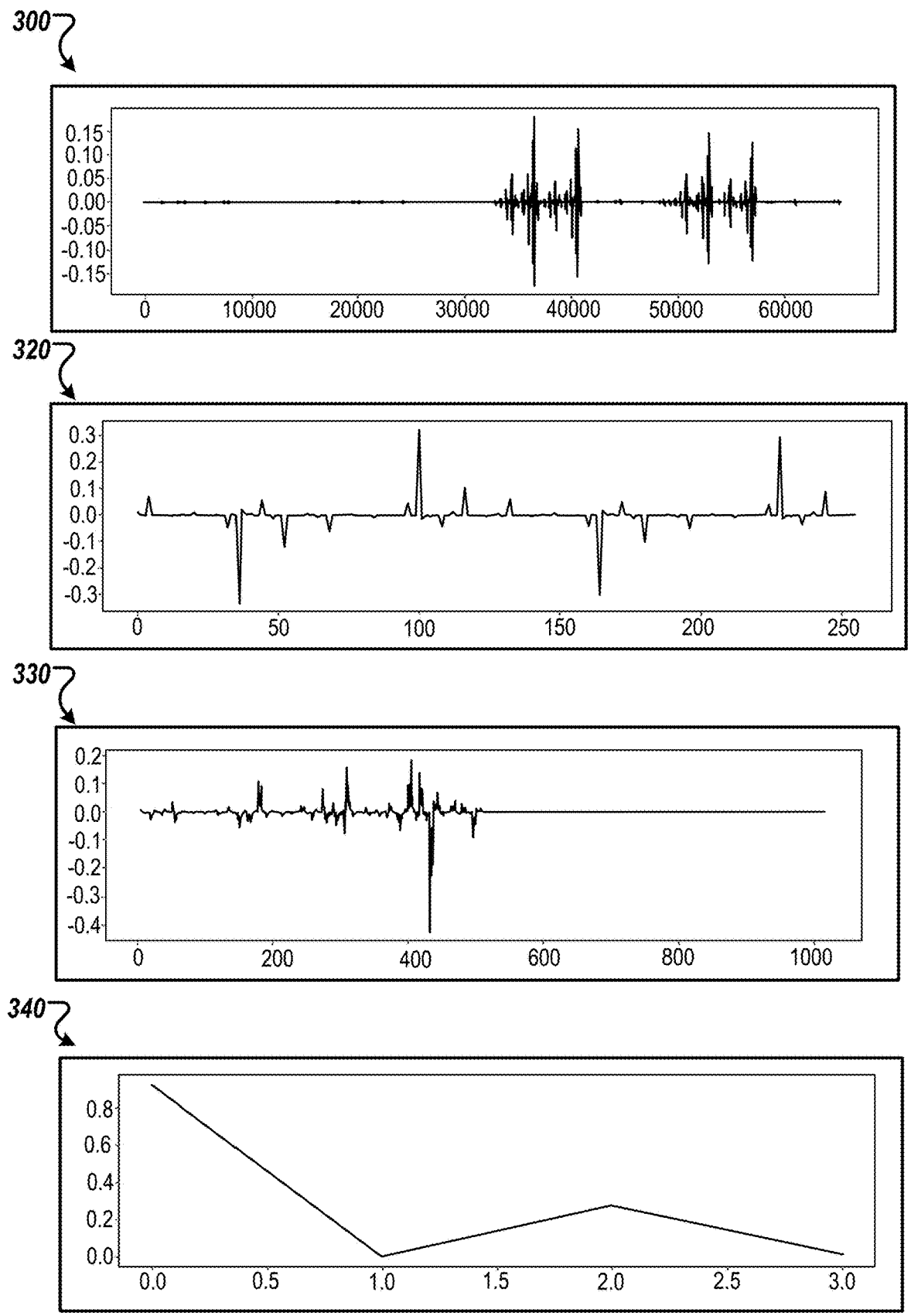
FIG. 3 shows example quantum fingerprints for different hash digests.

FIG. 3 shows example quantum fingerprints for different hash digests. In each example quantum fingerprint, the x-axis represents possible outcomes (e.g., the candidate subgroups described below) and the y-axis represents (unnormalized) probability amplitudes associated with the possible outcomes.

The first example quantum fingerprint 300 has been generated according to example process 200 for a hash digest obtained using the hashing algorithm SHA-256, where the hash digest is divided into 16 groups (i.e., the number of selected qubits is 16) of size 4. The second example quantum fingerprint 320 has been generated according to example process 200 for the same hash digest obtained using the hashing algorithm SHA-256, where the hash digest is divided into 8 groups (i.e., the number of selected qubits is 8) of size 8. The third example quantum fingerprint 330 has been generated according to example process 200 for a hash digest obtained using the hashing algorithm SHA-1, where the hash digest is divided into 10 groups (i.e., the number of selected qubits is 10) of size 4. The fourth example quantum fingerprint 340 has been generated according to example process 200 for a hash digest obtained using the hashing algorithm SHA-256, where the hash digest is divided into 2 groups (i.e., the number of selected qubits is 2) of size 32. As shown, increasing the number of groups (or equivalently, decreasing the group size) produces a more complex quantum fingerprint.

Returning to FIG. 2, in some implementations the system can perform steps 208 and 210 using classical computation only, e.g., by classically simulating initialization of the quantum system and computation of the expectation value. In other implementations, steps 208 and 210 can be performed using both classical and quantum computation. For example, in some implementations the system can include classical computing devices only. In these implementations, the system can transmit a request to a quantum computing provider to perform quantum computations to initialize the quantum system and compute the expectation value. The system can then receive results from the quantum computations, e.g., a computed expectation value, from the quantum computing provider. As another example, in some implementations, the system can include a quantum computing device. In these implementations, the system can perform steps 208 and 210 using the quantum computing device.

The system provides an enhanced hash digest for the data input as output. For example, in some implementations the system can directly provide the quantum fingerprint as an enhanced hash digest as output (212a). In other implementations, the system can apply a hashing algorithm to the quantum fingerprint to re-hash the hash digest obtained at step 202 and provide the re-hashed hash digest as output (step 212b).

In some implementations, the system can receive a predetermined sampling strategy selected by a user, e.g., included in the user-selected values of parameters for generating the quantum fingerprint received at step 202, and sample values of the quantum fingerprint according to the predetermined sampling strategy. The system can the provide the sampled values of the quantum fingerprint as output at step 212a or can apply a hashing algorithm to the sampled values of the quantum fingerprint to generate a re-hashed hash digest and provide the re-hashed hash digest as output at step 212b.

Figure 4:
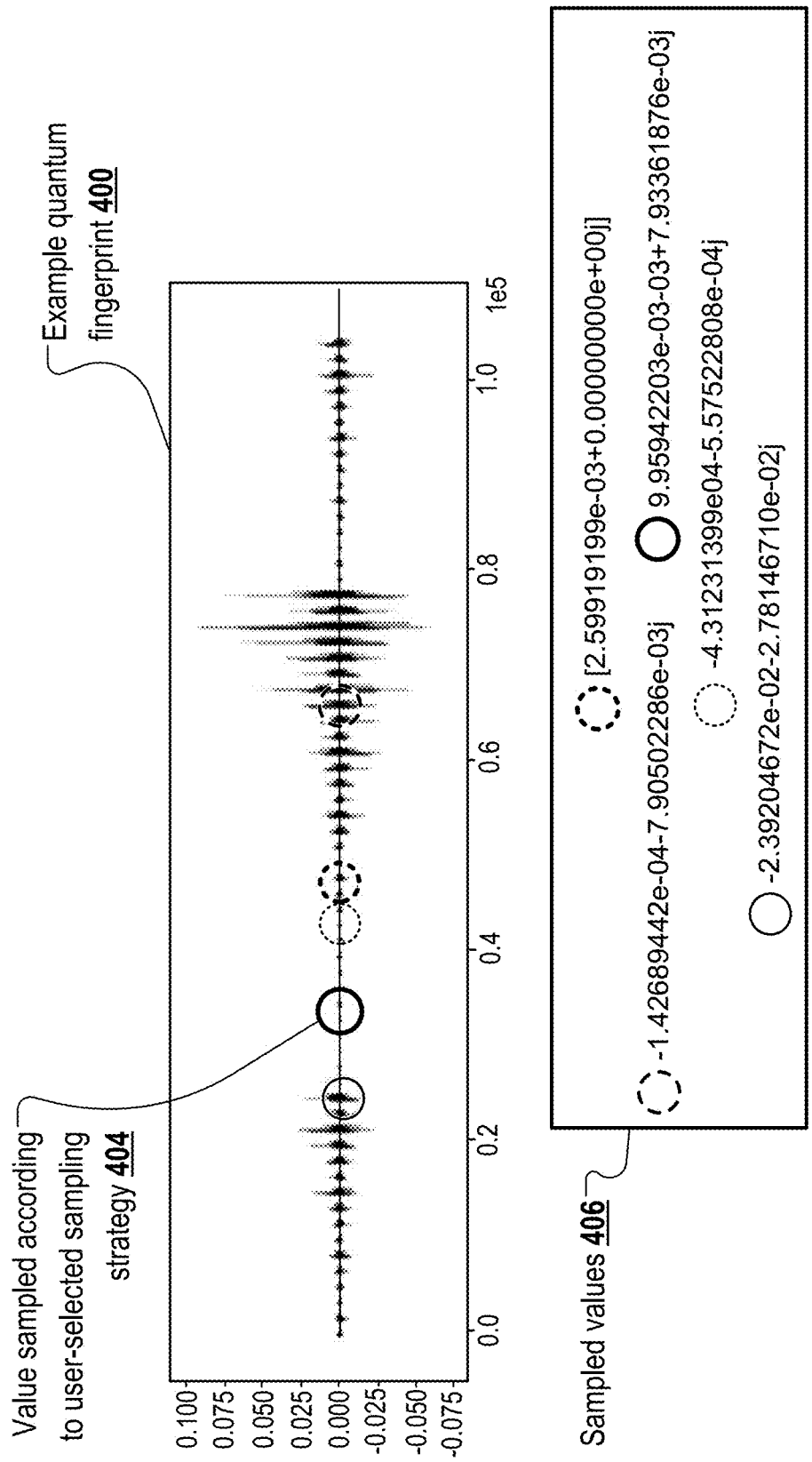
FIG. 4 shows an example strategy for sampling from a quantum fingerprint.

FIG. 4 shows an example sampling strategy for a quantum fingerprint 400. Different sampling strategies or pre-defined sampling functions can be applied. For example, in some implementations a random number in the interval $[0, 2^q-1]$ can be generated and used to seed a parameterized sampling strategy, e.g., where the parameters specify a number of samples to take and a frequency of samples to take. In the example shown in FIG. 4, five values are sampled according to user-selected sampling strategy parameters 404 to produce corresponding sampled values 406.

Figure 5:
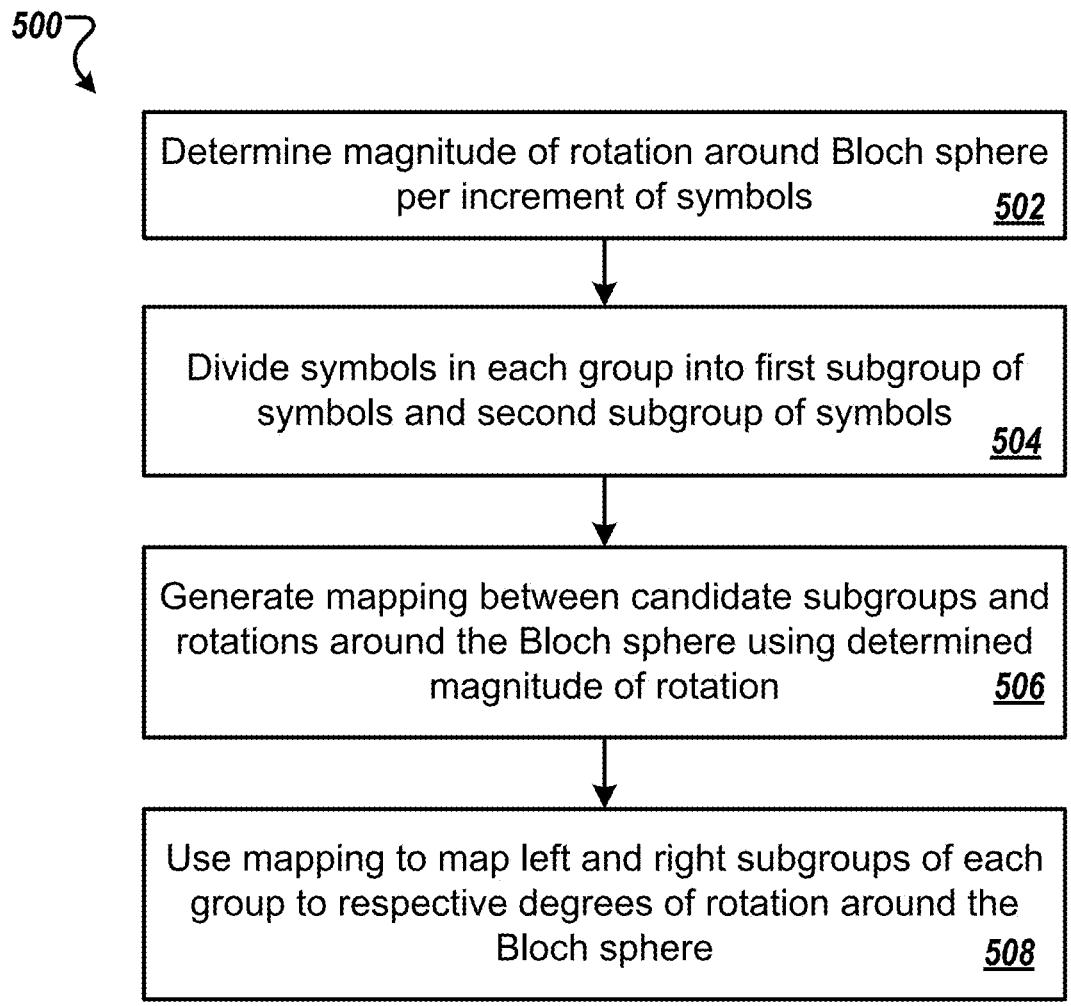
FIG. 5 is a flowchart of an example process for mapping groups of hash digest symbols to respective points on the Bloch sphere.

FIG. 5 is a flowchart of an example process 500 for mapping groups of hash digest symbols to respective points on the Bloch sphere. For convenience, the process 500 will be described as being performed by a system that includes one or more classical computing devices located in one or more locations. For example, system 100 of FIG. 1, appropriately programmed in accordance with this specification, can perform the process 500.

The system determines, based on the number of groups, a magnitude of rotation around the Bloch sphere per increment of symbols in the hash digest (step 502). To determine the magnitude of rotation around the Bloch sphere per increment of symbols in the hash digest, the system can compute $360/(h^{q/2}-1)$, where h represents the maximum number of different symbols in the hash digest and q represents the number of qubits (or equivalently the number of groups).

For example, in cases where the hash digest can include hexadecimal symbols (therefore h=16), the length of the hash digest is 40 (therefore l=40), the number of groups is equal to 20 (therefore q=20), and the size of each group is $$2\left(g = \frac{l}{q} = 2\right)$$

then the system can compute the magnitude of rotation around the Bloch sphere per increment as $$360/\left(h^{\frac{g}{2}} - 1\right) = 360/\left(16^{\frac{2}{2}} - 1\right) = 360/(16-1) = 24 \text{ degrees.}$$

As another example, in cases where the hash digest can include hexadecimal symbols (therefore h=16), the length of the hash digest is 40 (therefore l=40), the number of groups is equal to 10 (therefore q=10), and the size of each group is 4 (g=4) then the system can compute the magnitude of rotation around the Bloch sphere per increment as $$360/\left(h^{\frac{g}{2}} - 1\right) = 360/\left(16^{\frac{4}{2}} - 1\right) = 360/(255) = 1.41176 \text{ degrees.}$$

As another example, in cases where the hash digest can include hexadecimal symbols (therefore h=16), the length of the hash digest is 40 (therefore l=40), the number of groups is equal to 5 (therefore q=5), and the size of each group is 8 (g=8) then the system can compute the magnitude of rotation around the Bloch sphere per increment as $$360/\left(h^{\frac{g}{2}} - 1\right) = 360/\left(16^{\frac{8}{2}} - 1\right) = 360/(4095) = 0.08791 \text{ degrees.}$$

The system divides symbols in each group into a first, e.g., left, subgroup of symbols and a second, e.g., right, subgroup of symbols (step 504). For example, the system can divide each group into two equally sized subgroups (therefore each group obtained at step 204 of example process 200 described above would have an even number of symbols). For example, the group "78" could be divided in a left subgroup "7" and a right subgroup "78". As another example, the group "78cf" could be divided in a left subgroup "78" and a right subgroup "cf". As another example, the group "78cfa9db" could be divided in a left subgroup "78cf" and a right subgroup "a9db".

The system uses the determined magnitude of rotation around the Bloch sphere per increment to generate a mapping between that links each possible value the left or right subgroup can take (referred to herein as "candidate subgroups") with a respective rotation around the Bloch sphere (step 506). The number of candidate subgroups is dependent on the hashing algorithm used to generate the hash digest and the size of the subgroups generated at step 504. For example, in cases where the hash digest includes hexadecimal symbols and each subgroup is of size 1 (so the group size is 2), there would be 16 candidate subgroups, i.e., 1, 2, 3, . . . , F. In cases where the hash digest includes hexadecimal symbols and each subgroup is of size 2 (so the group size is 4), there would be 256 candidate subgroups, i.e., 00, 01, 02, 03, . . . , FE, FF.

To generate the mapping, the system can map a first candidate subgroup to a zero rotation around the Bloch sphere. The system can then iteratively increment the zero rotation around the Bloch sphere by the magnitude of rotation determined at step 502, where at each iteration a subsequent candidate subgroup is mapped to the incremented rotation around the Bloch sphere to obtain a mapping of all candidate subgroups to respective rotations around the Bloch sphere. Since the mapping will be used to initialize a quantum system, as described above with reference to FIG. 2, the system can further convert values computed in degrees to radians, i.e., by multiplying the degree value by $\pi$ and dividing by 180.

An example mapping for the case where the hash digest includes hexadecimal symbols and each subgroup is of size 1 (and the magnitude of rotation around the Bloch sphere per increment is therefore 24 degrees) is given below:

| Hex value | Degree | Radian |
| --- | --- | --- |
| 0 | 0 | 0 |
| 1 | 24 | 0.418879 |
| 2 | 48 | 0.837758 |
| 3 | 72 | 1.25664 |
| 4 | 96 | 1.67552 |
| 5 | 120 | 2.0944 |
| 6 | 144 | 2.51327 |
| . . . | . . . | . . . |
| . . . | . . . | . . . |
| E | 336 | 5.86431 |
| F | 360 | 6.28319 |

The system can then use the mapping to map the first and second subgroups of each group in the hash digest to respective degrees of rotation around the Bloch sphere. The mapped degrees of rotation for each first (left) subgroup can correspond to colatitude angles for respective points on the Bloch sphere and the mapped degrees of rotation for each right subgroup can correspond to longitude angles for respective points on the Bloch sphere. For example, the group "78" could be mapped to the degrees of rotation [θ=124.0, φ=96.0] which, when converted from degrees to radians, corresponds to the point (sin θ cos φ, sin θ sin φ, cos θ)=(sin 2.16 cos 1.96, sin 2.16 sin 1.68, cos 21.16) on the Bloch sphere and the state $$|\psi\rangle = \cos\frac{2.16}{2}|0\rangle + e^{1.68i}\sin\frac{2.16}{2}|1\rangle.$$

Figure 6:
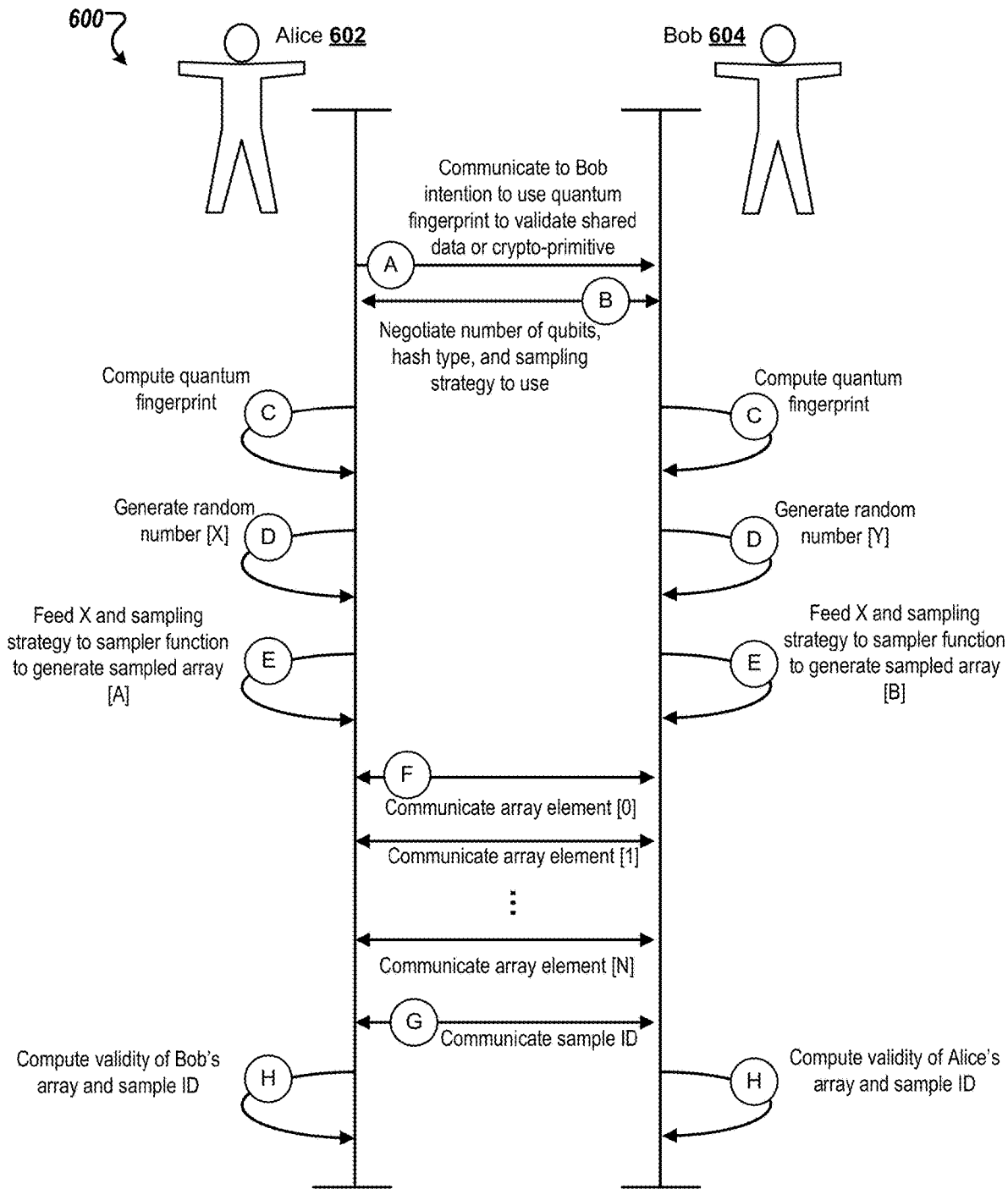
FIG. 6 shows a conceptual block diagram of an example process for using a quantum fingerprint to enable two parties to validate a shared secret or cryptographic primitive.

FIG. 6 shows a conceptual block diagram of an example process 600 for using a quantum fingerprint to enable two parties to validate shared data or a shared cryptographic primitive/key. The example process 600 is performed between a first party "Alice" 602 and second party "Bob" 604. Communications between Alice 602 and Bob 604 can occur through any communication channel, e.g., a trusted or untrusted communication channel.

During stage (A) of the example process 600, Alice 602 communicates to Bob that she intends to use the presently described quantum fingerprint techniques, e.g., example process 200 of FIG. 2, to validate pre-shared data or a pre-shared cryptographic primitive/key.

During stage (B), Alice 602 and Bob 604 communicate with each other to negotiate values of parameters for generating the quantum fingerprint, e.g., a number of qubits to use, a hash type, and sampling strategy.

During stage (C), both Alice 602 and Bob 604 each compute a quantum fingerprint for the shared data or shared cryptographic primitive/key, e.g., according to example process 200 of FIG. 2.

During stage (D), both Alice 602 and Bob 604 each generate a respective random number from the interval [0, $2^q-1$], where q represents the number of qubits negotiated during stage (B).

During stage (E), Alice 602 uses the random number she generated during stage (D) to seed the sampling strategy negotiated during stage (B) and generate a sampled array of values [A] of the quantum fingerprint. Similarly, during stage (E), Bob 604 uses the random number he generated during stage (D) to seed the sampling strategy negotiated during stage (B) and generate a sampled array of values [B] of the quantum fingerprint.

During stage (F), Alice 602 communicates the elements 0, 1, . . . , N of her sampled array [A] to Bob 604. Similarly, Bob 604 communicates the elements 0, 1, . . . , N of his sampled array [B] to Alice 602. In some implementations, Alice 602 and Bob 604 can choose not to expose the elements of their sampled arrays during transmission to one another, and can negotiate a function or operation to apply to their sampled arrays before the elements are communicated to each other, e.g., an XoR, Mod or Multiply function.

During stage (G), both Alice 602 and Bob 604 each communicate the random numbers they generated during stage (D) (referred to as a "sample ID") to each other.

During stage (H), Alice 602 uses the sample ID received from Bob 604 during stage (G) to validate the sampled array [B] received from Bob 604 during stage (F). For example, Alice 602 can use the sampled ID received from Bob to seed the sampling strategy negotiated during stage (B) and generate a second sampled array of values [B'] of the quantum fingerprint she computed during stage (C). If the second sampled array of values [B'] matches the sampled array [B] received from Bob 604 during stage (F), Alice 602 can validate the sampled array [B] received from Bob 604 during stage (F). For example, Alice 602 can determine that the shared data or a shared cryptographic primitive/key has not been compromised or maliciously altered.

Similarly, during stage (H), Bob 604 uses the sample ID received from Alice 602 during stage (G) to validate the sampled array [A] received from Alice 602 during stage (F). For example, Bob 604 can use the sampled ID received from Alice 602 to seed the sampling strategy negotiated during stage (B) and generate a second sampled array of values [A'] of the quantum fingerprint he computed during stage (C). If the second sampled array of values [A'] matches the sampled array [A] received from Alice 602 during stage (F), Bob 604 can validate the sampled array [B] received from Alice 602 during stage (F). For example, Bob 604 can determine that the shared data or a shared cryptographic primitive/key has not been compromised or maliciously altered.

Figure 7:
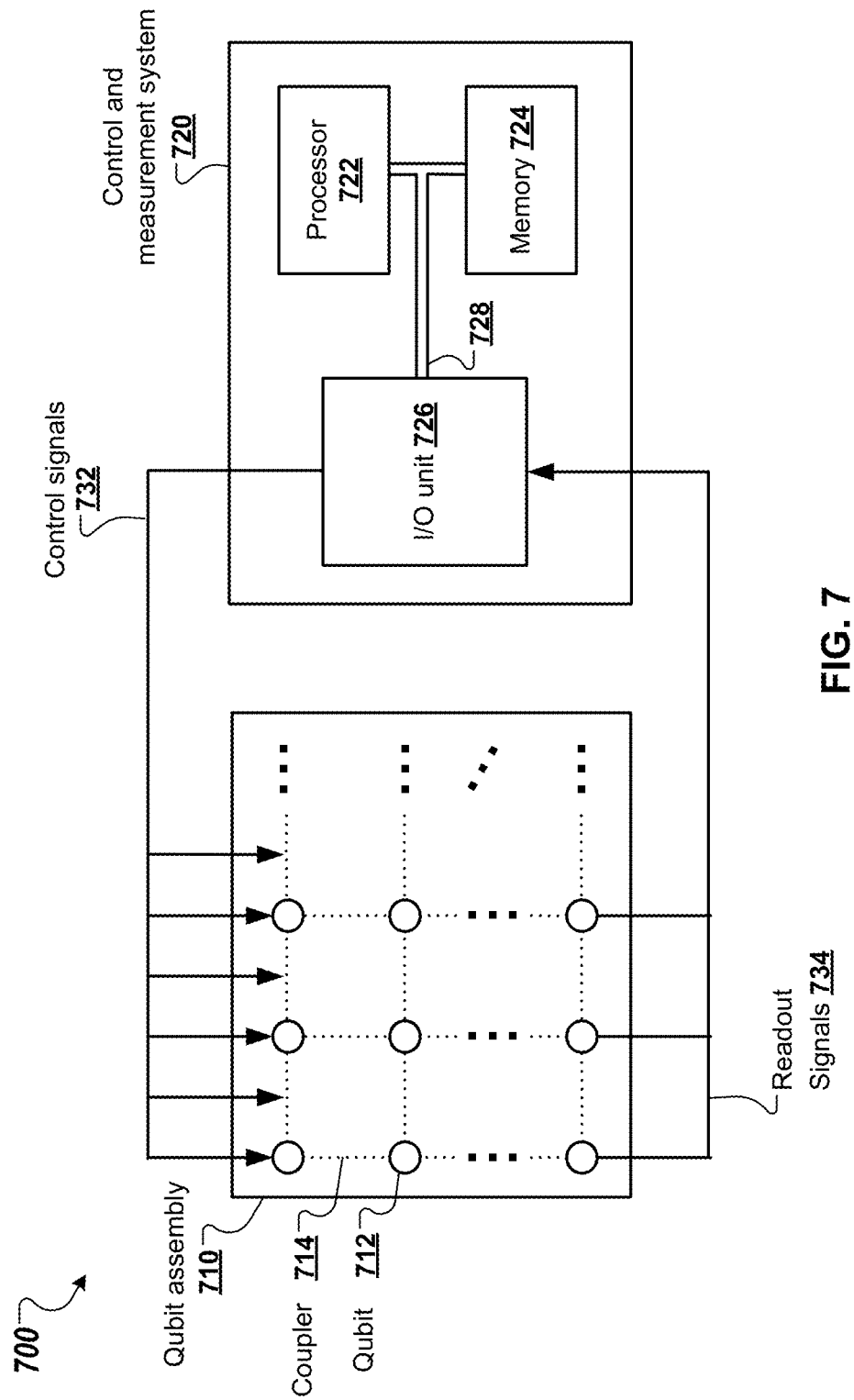
FIG. 7 illustrates a schematic diagram of an example quantum computing device.

FIG. 7 is a block diagram of an example quantum computing device 700. The quantum computing device 700 can be used to perform the quantum computation operations described in this specification according to some implementations. The quantum computing device 700 is intended to represent various forms of quantum computing devices. The components shown here, their connections and relationships, and their functions, are exemplary only, and do not limit implementations of the inventions described and/or claimed in this document.

The quantum computing device 700 includes a qubit assembly 710 and a control and measurement system 720. The qubit assembly includes multiple qubits, e.g., qubit 712, that are used to perform algorithmic operations or quantum computations. While the qubits shown in FIG. 7 are arranged in a rectangular array, this is a schematic depiction and is not intended to be limiting. The qubit assembly 710 also includes adjustable coupling elements, e.g., coupler 714, that allow for interactions between coupled qubits. In the schematic depiction of FIG. 7, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits.

Each qubit can be a two-level quantum system or device having levels representing logical values of 0 and 1. The specific physical realization of the multiple qubits and how they interact with one another is dependent on a variety of factors including the type of the quantum computing device 700 or the type of quantum computations that the quantum computing device 700 is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in a NMR quantum computer the qubits may be realized via nuclear spin states.

In some implementations a quantum computation can proceed by initializing the qubits in a selected initial state and applying a sequence of quantum logic gates to the qubits. Example quantum logic gates include single-qubit gates, e.g., Pauli-X, Pauli-Y, Pauli-Z (also referred to as X, Y, Z), Hadamard and S gates, two-qubit gates, e.g., controlled-X, controlled-Y, controlled-Z (also referred to as CX, CY, CZ), and gates involving three or more qubits, e.g., Toffoli gates. The quantum logic gates can be implemented by applying control signals 732 generated by the control and measurement system 720 to the qubits and to the couplers.

For example, in some implementations the qubits in the qubit assembly 710 can be frequency tuneable. In these examples, each qubit can have associated operating frequencies that can be adjusted through application of voltage pulses via one or more drive-lines coupled to the qubit.

Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tuneable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 732 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits, e.g., using a quantum observable such as Z, using respective control signals 734. The measurements cause readout signals 734 representing measurement results to be communicated back to the measurement and control system 720. The readout signals 734 may include RF, microwave, or optical signals depending on the physical scheme for the quantum computing device 700 and/or the qubits. For convenience, the control signals 732 and readout signals 734 shown in FIG. 7 are depicted as addressing only selected elements of the qubit assembly (i.e. the top and bottom rows), but during operation the control signals 732 and readout signals 734 can address each element in the qubit assembly 710.

The control and measurement system 720 is an example of a classical computer system that can be used to perform various operations on the qubit assembly 710, as described above. The control and measurement system 720 includes one or more classical processors, e.g., classical processor 722, one or more memories, e.g., memory 724, and one or more I/O units, e.g., I/O unit 726, connected by one or more data buses, e.g., bus 726. The control and measurement system 720 can be programmed to send sequences of control signals 732 to the qubit assembly, e.g. to carry out a selected series of quantum gate operations, and to receive sequences of readout signals 734 from the qubit assembly, e.g. as part of performing measurement operations.

The processor 722 is configured to process instructions for execution within the control and measurement system 720. In some implementations, the processor 722 is a single-threaded processor. In other implementations, the processor 722 is a multi-threaded processor. The processor 722 is capable of processing instructions stored in the memory 724.

The memory 724 stores information within the control and measurement system 720. In some implementations, the memory 724 includes a computer-readable medium, a volatile memory unit, and/or a non-volatile memory unit. In some cases, the memory 724 can include storage devices capable of providing mass storage for the system 720, e.g. a hard disk device, an optical disk device, a storage device that is shared over a network by multiple computing devices (e.g., a cloud storage device), and/or some other large capacity storage device.

The input/output device 726 provides input/output operations for the control and measurement system 720. The input/output device 726 can include D/A converters, A/D converters, and RF/microwave/optical signal generators, transmitters, and receivers, whereby to send control signals 732 to and receive readout signals 734 from the qubit assembly, as appropriate for the physical scheme for the quantum computer. In some implementations, the input/output device 726 can also include one or more network interface devices, e.g., an Ethernet card, a serial communication device, e.g., an RS-232 port, and/or a wireless interface device, e.g., an 802.11 card. In some implementations, the input/output device 726 can include driver devices configured to receive input data and send output data to other external devices, e.g., keyboard, printer and display devices.

Although an example control and measurement system 720 has been depicted in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Figure 8:
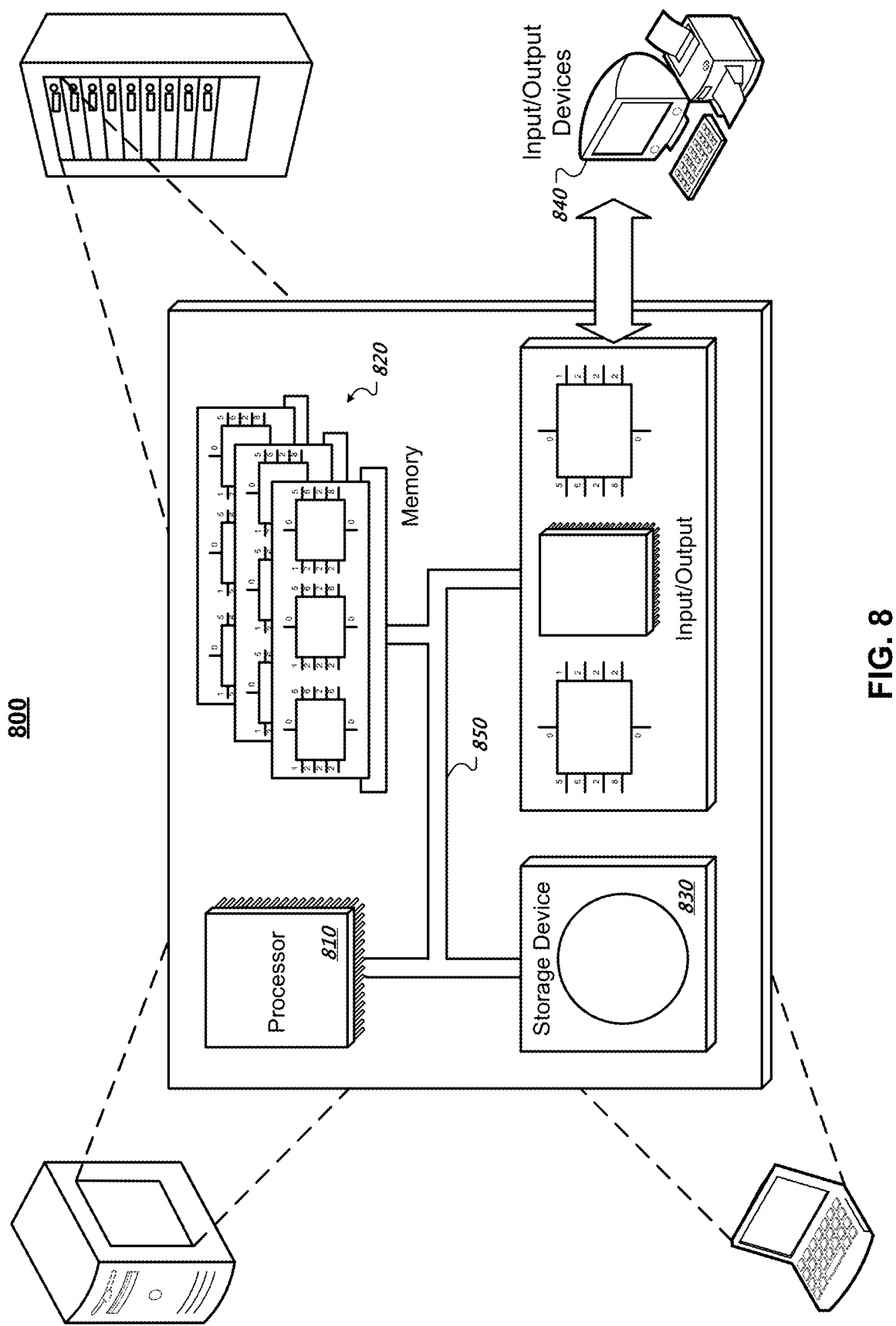
FIG. 8 illustrates a schematic diagram of an exemplary generic classical processor system.

FIG. 8 illustrates a schematic diagram of an exemplary generic classical processor system 800. The system 800 can be used for the classical operations described in this specification according to some implementations. The system 800 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 800 includes a processor 810, a memory 820, a storage device 830, and an input/output device 840. Each of the components 810, 820, 830, and 820 are interconnected using a system bus 850. The processor 810 may be enabled for processing instructions for execution within the system 800. In one implementation, the processor 810 is a single-threaded processor. In another implementation, the processor 810 is a multi-threaded processor. The processor 810 may be enabled for processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 may be enabled for providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules or engines of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, an engine, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a mark-up language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   obtaining a hash digest that represents a data input;
   dividing symbols in the hash digest into a number of groups of equal size;
   mapping each group to a respective point on a Bloch sphere;
   initializing a quantum system comprising multiple qubits, comprising initializing each qubit of the multiple qubits in a quantum state specified by a respective point on the Bloch sphere; and
   computing an expectation value of the initialized quantum system to obtain a quantum fingerprint for the data input.

2. The method of claim 1, wherein mapping each group to a respective point on a Bloch sphere comprises:
   determining, based on the number of groups, a magnitude of rotation around the Bloch sphere per increment of symbols in the hash digest;
   dividing symbols in each group into a first subgroup of symbols and a second subgroup of symbols;
   generating, using the magnitude of rotation, a mapping between candidate subgroups in a set of candidate subgroups and respective degrees of rotation around the Bloch sphere, wherein the first subgroup and second subgroup are elements of the set of candidate subgroups; and
   using the mapping to map, for each group, the first subgroup of symbols and right subgroup of symbols to respective rotations around the Bloch sphere.

3. The method of claim 2, wherein mapping the first subgroup of symbols and right subgroup of symbols to respective rotations around the Bloch sphere comprises mapping the first subgroup to a colatitude angle for a rotation around the Bloch sphere and mapping the right subgroup to a longitude angle for the rotation around the Bloch sphere.

4. The method of claim 3, further comprising converting the colatitude angle and the longitude angle from degrees to radians.

5. The method of claim 2, wherein determining the magnitude of rotation around the Bloch sphere per increment of symbols in the hash digest comprises computing $360/(h^{g/2}-1)$, where h represents a maximum number of different symbols in the hash digest, and g represents the number of groups.

6. The method of claim 2, wherein mapping each first subgroup of symbols and a right subgroup of symbols to respective rotations around the Bloch sphere using the magnitude of rotation per increment, comprising:
   mapping a first candidate subgroup to a zero rotation around the Bloch sphere, and iteratively incrementing the zero rotation around the Bloch sphere by the magnitude of rotation, wherein at each iteration a subsequent candidate subgroup is mapped to the incremented rotation around the Bloch sphere, to obtain a mapping of all candidate subgroups to respective rotations around the Bloch sphere.

7. The method of claim 1, wherein initializing the quantum system and computing the expectation value of the initialized quantum system comprises classically simulating initialization of the quantum system and computation of the expectation value.

8. The method of claim 1, wherein initializing the quantum system and computing the expectation value of the initialized quantum system comprises:
transmitting a request to a quantum computer to perform quantum computations to initialize the quantum system and compute the expectation value; and
receiving a computed expectation value from the quantum computer.

9. The method of claim 1, wherein mapping each group to a respective point on a Bloch sphere comprises for each group, determining a colatitude angle and a longitude angle that specifies the respective point of the Bloch sphere.

10. The method of claim 9, wherein initializing a qubit of the multiple qubits in a quantum state specified by a respective point on the Bloch sphere comprises applying a parameterized single qubit rotation gate to the qubit, wherein parameters of the single qubit rotation gate comprise the colatitude angle and the longitude angle that specifies the point of the Bloch sphere.

11. The method of claim 1, wherein computing the expectation value of the initialized quantum system comprises:
computing a statevector of the initialized quantum system; and
converting the statevector into an array of continuous values, wherein entries in the array comprises probability amplitudes that corresponds to respective symbols of a hashing algorithm used to generate the hash digest.

12. The method of claim 1, wherein the number of groups comprises a pre-determined number of groups specified by a user, wherein the number of groups corresponds to a number of qubits in the multiple qubits.

13. The method of claim 1, wherein the hash digest comprises an even number of symbols.

14. The method of claim 1, further comprising:
receiving the data input and data identifying a user-specified hashing algorithm;
applying the hashing algorithm to the data input to generate the hash digest.

15. The method of claim 1, wherein the quantum fingerprint comprises an array of continuous values, and wherein the method further comprises applying a hashing algorithm to the quantum fingerprint to obtain an enhanced hash digest for the data input.

16. The method of claim 1, further comprising:
receiving a predetermined sampling strategy selected by a user;
sampling values of the quantum fingerprint according to the predetermined sampling strategy; and
providing the sampled values of the quantum fingerprint as output or applying a hashing algorithm to the sampled values of the quantum fingerprint to obtain an enhanced hash digest for the data input.

17. The method of claim 1, wherein
the method is performed by a first party;
the data input comprises data shared with a second party; and
the method further comprises:
receiving, from the second party, a first array of values sampled from a quantum fingerprint generated by the second party and a first random number;
sampling a second array of values from the quantum fingerprint generated by the first party using a sampling strategy seeded by the first random number; and
validating the first array of values by comparing the second array of values to the first array of values.

18. The method of claim 17, further comprising:
generating a second random number from an interval that ranges from zero to two to the power of the number of groups;
sampling a third array of values from the quantum fingerprint generated by the first party using the sampling strategy seeded by the second random number; and
providing, to the second party, the third array of values and the second random number, wherein the second party uses the second random number to validate the third array of values.

19. A system comprising:
one or more data processing apparatuses; and
non-transitory computer readable storage media in data communication with the one or more data processing apparatuses and storing instructions that, when executed by the data processing apparatuses, cause the one or more data processing apparatuses to perform operations comprising:
obtaining a hash digest that represents a data input;
dividing symbols in the hash digest into a number of groups of equal size;
mapping each group to a respective point on a Bloch sphere;
initializing a quantum system comprising multiple qubits, comprising initializing each qubit of the multiple qubits in a quantum state specified by a respective point on the Bloch sphere; and
computing an expectation value of the initialized quantum system to obtain a quantum fingerprint for the data input.

20. A non-transitory computer-readable storage medium comprising instructions stored thereon that are executable by a processing device and upon such execution cause the processing device to perform operations comprising:
obtaining a hash digest that represents a data input;
dividing symbols in the hash digest into a number of groups of equal size;
mapping each group to a respective point on a Bloch sphere;
initializing a quantum system comprising multiple qubits, comprising initializing each qubit of the multiple qubits in a quantum state specified by a respective point on the Bloch sphere; and
computing an expectation value of the initialized quantum system to obtain a quantum fingerprint for the data input.

* * * * *